Patented May 29, 1945

2,376,963

UNITED STATES PATENT OFFICE 2,376,963

POLYMERIZATION OF ORGANIC COMPOUNDS CONTAINING A CH₂=C< GROUP

Benjamin S. Garvey, Jr., Akron, Ohio, assignor to The B. F. Goodrich Company, New York, N. Y., a corporation of New York No Drawing. Application June 26, 1941,
Serial No. 399,934

6 Claims. (Cl. 260—84.5)

This invention relates to the polymerization of unsaturated organic compounds which are capable of undergoing an addition polymerization to form high molecular weight linear polymers, particularly butadienes and mixtures of butadienes with other unsaturated compounds copolymerizable therewith. More specifically, this invention relates to new initiators of polymerization, and to the improved rubber-like or resinous products obtained when the polymerization is effected in presence of such new initiators.

It is well known that the conditions such as time and temperature which are necessary for linear polymerizations and the quality and usefulness of the polymers produced are determined largely by the nature of the substances present along with the monomeric materials during the polymerization process. In practically all addition polymerizations which yield a high molecular weight linear polymer, for example, whether carried out in a homogeneous system or in emulsion, the presence of an initiator of polymerization, that is, a substance which by some chemical action causes the polymerization to begin, is essential to completion of the process in a reasonably short time and at a reasonably low temperature. Oxygen-containing compound such as hydrogen peroxide, benzoyl peroxide and persalts have heretofore been almost universally employed for this purpose. When such oxygen-containing initiators are used, however, these compounds may also function to oxidize the linear polymer as it is produced and thereby increase its degree of cross-linking or decrease its chain length both of which are extremely undesirable because of their deleterious effect on the properties of the polymer. In the polymerization of butadienes and monomer mixtures containing a butadiene to rubber-like polymers or copolymers it is especially important that the product be substantially free of cross-linked structures since these render the polymers hard and unworkable. Accordingly, for many purposes, it is desirable to utilize compounds other than oxygen-containing compounds as initiators of polymerization. The principal object of this invention is to provide such new initiators.

In accordance with this invention aromatic diazo compounds are employed as initiators for the polymerization of unsaturated organic compounds which undergo addition polymerizations to form high molecular weight linear polymers. These new initiators enable polymerizations to be carried out in good yield in a relatively short time and also improve the properties of polymers formed in their presence over those prepared using the known initiators.

The compounds employed as polymerization initiators in this invention are commonly known as the aromatic diazo compounds and are characterized by the presence of the diazo structure —N=N— linked on the one hand to an aromatic carbon atom and on the other hand to an element other than carbon and nitrogen. These compounds may accordingly be represented by the formula Ar—N=N—X where Ar is an aromatic radical and X is an inorganic anion or an organic radical linked through oxygen. Included in this class of compounds are the diazonium salts having the formula Ar—N=N—X where X is an inorganic anion, such as benzene diazonium chloride, benzene diazonium bromide, benzene diazonium hydrogen sulfate, benzene diazonium cyanide, benzene diazonium perchlorate, p-chloro phenyl diazonium chloride, 2-5 dichloro phenyl diazonium chloride, 2-4-6 tribromo phenyl diazonium hydrogen sulfate, benzene diazonium sulfonic acid

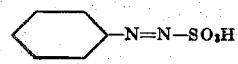

p-phenylene bis diazonium chloride, p-toluene diazonium chloride, o-toluene diazonium chloride, xylene diazonium nitrate, alpha naphthalene diazonium chloride and the like, as well as inner diazonium salts such as p-diazobenzene sulfonic acid

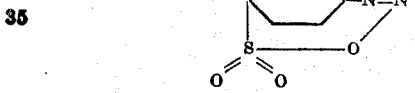

and similar diazides of sulfonic acids; the diazotates having the formula Ar—N=N—O—M where M is hydrogen or a metallic element such as benzene diazo hydroxide, potassium benzene diazotate, sodium benzene isodiazotate, sodium p-nitrophenyl diazotate, potassium naphthalene diazotate and the like; the ethers of aromatic diazo compounds such as diazobenzene methyl ether Ph—N=N—OCH₃, p-nitrophenyl diazo methyl ether, 2-4-6 trichlorophenyl diazo methyl ether, diazo benzene ethyl ether and the like; and other similar compounds such as benzene diazo oxide.

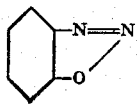

and the like. The particular compounds preferred will depend largely upon the system undergoing polymerization and the method of polymerization being used as will be hereinafter explained.

As has already been mentioned, these initiators may be employed in the polymerization of unsaturated organic compounds which are capable of undergoing an addition polymerization to form a linear polymer. The principal types of unsaturated compounds which form linear polymers are the vinyl type compounds and the butadienes but, in general, other unsaturated compounds containing the polymerizable structure

where at least one of the dangling valencies is connected to an electron attracting group, that is, a group which substantially increases the electrical dissimetry or polar character of the molecule, also possess this property. Two or more monomers which are capable of forming linear polymers and which are capable of copolymerizing with one another may also be employed in admixture as the polymerizable material. Thus the monomeric material may be a butadiene by which is meant butadiene-1,3 and its homologs and analogs which polymerize in essentially the same manner such as isoprene, 2,3-dimethyl butadiene, piperylene, chloroprene, and the like, by itself, or may be a mixture of such butadienes, or a mixture containing one or more butadienes and one or more other unsaturated compounds which are copolymerizable therewith, among which are, for example, aryl olefins, such as styrene, vinyl naphthalene, and their chloro or alkoxy substituted derivatives; alpha methylene carboxylic acids and their esters, nitriles, amides and the like such as acrylic acid, methacrylic acid, methyl acrylate, methyl methacrylate, ethyl methacrylate, methyl ethacrylate, butyl acrylate, isobutyl methacrylate, acrylonitrile, methacrylonitrile, ethacrylonitrile, acrylamide, methacrylamide and the like and other unsaturated polymerizable compounds such as vinylidene chloride, methyl vinyl ether, methyl vinyl ketone, vinyl furane, vinyl ethinyl alkyl carbinols, vinyl acetylene and other unsaturated hydrocarbons, esters, ketones, acids, alcohols, ethers and the like. The initiators of this invention are especially suitable for the polymerization of those monomeric materials containing a butadiene as one of the essential constituents and are even more suitable when the butadiene is the predominant constituent and a synthetic rubber-like material is obtained as the product, but they may also be used in the polymerization of monomeric materials not containing a butadiene but which do contain one or more of the unsaturated compounds mentioned above as being copolymerizable with conjugated dienes such as styrene, etc., or other vinyl type compounds such as vinyl chloride, vinyl acetate and the like.

In the practice of the invention the aromatic diazo compound is added to the monomeric material and the monomeric material is then polymerized by any of the well known methods of forming linear polymers such as by polymerization in homogeneous systems or by polymerization in aqueous emulsion. In the emulsion polymerization process, which is at present preferred, the monomeric material is emulsified with water by the use of a suitable emulsifying agent such as a fatty acid soap or a synthetic saponaceous material, and polymerization is then effected by adding the initiator and agitating the emulsion at a temperature from about 20 to 50° C. until polymer is formed, this usually requiring from about 10 to 100 hours. When polymerization is effected in this manner it is desirable to employ an aromatic diazo compound which is water soluble and may act in the aqueous phase of the emulsion. For this purpose the diazonium salts such as benzene diazonium chloride which are effective in emulsions prepared with an acid emulsifying agent, the diazoates effective with alkaline emulsifying agents and the diazides of amino sulfonic acids such as p-diazo benzene sulfonic acid are especially suitable. If, on the other hand, polymerization is effected in a homogeneous system as by heating the monomeric material or a solution thereof, initiators which are easily soluble in the monomer or the solvent employed such as the ethers of aromatic diazo compounds like diazo benzene methyl ether are preferred.

The amount of the aromatic diazo compound used in the polymerization process may be varied over a wide range and is not critical. For most purposes, however, amounts varying from 0.2 to 2% of the initiator based on the total weight of the monomeric materials being polymerized are most effective. When the initiator is added in these amounts highest yields and best quality products are obtained.

As a specific example of one method of carrying out this invention a mixture of butadiene-1,3 and acrylonitrile is polymerized in aqueous emulsion the charge being made up as follows:

| | Parts |
|---|---|
| Butadiene-1,3 | 75 |
| Acrylonitrile | 25 |
| Emulsifying solution (3% aqueous solution of a fatty acid soap) | 250 |
| p-Diazobenzene sulfonic acid | 0.5 |

The emulsion is agitated at a temperature of 30° C. for 24 hours, at the end of this time the polymerization being complete. Coagulation of the latex-like dispersion resulting from this process yields a soft, plastic, tacky rubber-like copolymer. When employing hydrogen peroxide as the initiator in the above example a rubber-like copolymer is obtained which is considerably less plastic and tacky and more difficult to mill. The vulcanizates prepared from the copolymer made in accordance with this invention are also superior in tensile strength and ultimate elongation to those prepared from the product obtained with hydrogen peroxide as the initiator. If no initiator is employed in the above recipe, the polymerization requires over 150 hours and only a low yield of an inferior product results.

As another example of this invention, the above example is repeated except that a sodium lauryl sulfate solution is employed as the emulsifying solution, thereby giving an acidic emulsion. In this case the polymerization is completed in 48 hours and a plastic rubber-like copolymer which yields good vulcanizates is obtained. The oxygen-yielding initiators do not produce good polymers in a short time when employed in acidic emulsions.

Similar results may be obtained by the use of other aromatic diazo compounds and when polymerizing other monomeric materials. In addition it is to be understood that many other substances may be employed in the polymerization recipe without altering the effect of the initiators herein disclosed. Thus, modifiers of polymerization, accelerators of polymerization, catalysts of polymerization and other initiators of polymerization as well as substances which exert some other effect on the course of the polymerization or the properties of the product such as softeners or stabilizers for the product, may be added together with the monomeric materials and the initiators of polymerization of this invention either before, after or during the polymerization, if desired, the effect being that each substance functions in its own way to improve the process or the products. It is also to be understood that the method and conditions of polymerization may be varied. Accordingly, the invention is not intended to be limited except by the spirit and scope of the appended claims.

I claim:

1. In a process of polymerizing in aqueous emulsion a monomeric mixture containing butadiene-1,3 and styrene, the step which comprises adding p-diazo benzene sulfonic acid to the monomeric mixture before polymerization.

2. In a process of polymerizing in aqueous emulsion a monomeric mixture containing butadiene-1,3 and acrylonitrile, the step which comprises adding p-diazo benzene sulfonic acid to the monomeric mixture before polymerization.

3. In a process of polymerizing in aqueous emulsion a monomeric mixture containing butadiene-1,3 and methyl methacrylate, the step which comprises adding p-diazo benzene sulfonic acid to the monomeric mixture before polymerization.

4. In a process of polymerizing in aqueous emulsion a monomeric material comprising a butadiene-1,3, the step which comprises carrying out the polymerization in the presence of an aromatic diazo compound selected from the class consisting of:

(1) diazonium salts of the formula $Ar-N=N-X$ wherein Ar is an aromatic radical and X is an inorganic radical selected from the class consisting of Cl, Br, $HSO_4$ and $SO_3H$, (2) p-diazo benzene sulfonic acid, (3) diazotates of the formula $Ar-N=N-O-M$ wherein Ar is an aromatic radical and M is a member of the class consisting of hydrogen and alkali metals, (4) ethers of aromatic diazo compounds of the formula $Ar-N=N-O-R$ wherein Ar is an aromatic radical and R is a member of the class consisting of methyl and ethyl, and (5) benzene diazo oxide.

5. The process of claim 4 wherein the monomeric material polymerized is a mixture of butadiene-1,3 and styrene.

6. The process of claim 4 wherein the monomeric material polymerized is a mixture of butadiene-1,3 and acrylonitrile.

BENJAMIN S. GARVEY, JR.